(12) United States Patent
Aouini

(10) Patent No.: US 8,803,355 B2
(45) Date of Patent: Aug. 12, 2014

(54) SYSTEM FOR CONVERTING WIND ENERGY

(76) Inventor: Anis Aouini, Tunis (TN)

( * ) Notice: Subject to any disclaimer, the term of this patent is extended or adjusted under 35 U.S.C. 154(b) by 0 days.

(21) Appl. No.: 13/825,791

(22) PCT Filed: Oct. 6, 2010

(86) PCT No.: PCT/TN2010/000005
§ 371 (c)(1),
(2), (4) Date: Mar. 22, 2013

(87) PCT Pub. No.: WO2012/039688
PCT Pub. Date: Mar. 29, 2012

(65) Prior Publication Data
US 2013/0181458 A1    Jul. 18, 2013

(30) Foreign Application Priority Data

Sep. 22, 2010  (TN) ............................. TN2010/0433

(51) Int. Cl.
*F03D 9/00* (2006.01)
*H02P 9/04* (2006.01)
*F04B 17/02* (2006.01)

(52) U.S. Cl.
USPC .............................................. 290/55; 290/44

(58) Field of Classification Search
CPC ......... Y02B 10/30; F01C 13/00; F04B 17/02; Y02E 10/721; Y02E 10/726; Y02E 10/70; Y02E 60/15; Y02E 60/17; Y02T 10/6208; Y02T 10/7083; F03D 9/001; F03D 9/028; F03D 11/024; F05B 2260/406; F05B 2260/40311; F05B 2270/506; F05B 2270/604
USPC ..................................................... 290/44, 55
See application file for complete search history.

(56) References Cited

U.S. PATENT DOCUMENTS

| | | | | |
|---|---|---|---|---|
| 2,460,527 | A * | 2/1949 | Oliveros | 417/336 |
| 3,957,397 | A * | 5/1976 | Wendler | 417/271 |
| 4,496,847 | A * | 1/1985 | Parkins | 290/44 |
| 4,498,017 | A * | 2/1985 | Parkins | 290/44 |
| 5,122,031 | A * | 6/1992 | Westwood | 415/2.1 |
| 6,863,505 | B2 * | 3/2005 | Dietz | 417/334 |
| 7,656,055 | B2 * | 2/2010 | Torres et al. | 290/55 |
| 8,247,915 | B2 * | 8/2012 | Crane et al. | 290/44 |
| 2009/0230688 | A1 * | 9/2009 | Torres et al. | 290/55 |
| 2011/0109094 | A1 * | 5/2011 | Kenway et al. | 290/55 |
| 2011/0142596 | A1 * | 6/2011 | Nies | 415/13 |
| 2012/0045328 | A1 * | 2/2012 | Rashidi | 416/1 |
| 2013/0127170 | A1 * | 5/2013 | McConnell | 290/55 |
| 2013/0341934 | A1 * | 12/2013 | Kawanishi | 290/1 A |

FOREIGN PATENT DOCUMENTS

| | | |
|---|---|---|
| DE | 102005014026 A1 | 9/2006 |
| WO | 2010/147301 A2 | 12/2010 |

OTHER PUBLICATIONS

Preliminary International Report on Patentability International Application No. PCT/TN2010/000005 PCT Form/Separate Sheet/ 409 (Sheets 1-3).

* cited by examiner

*Primary Examiner* — Pedro J Cuevas
(74) *Attorney, Agent, or Firm* — Baker Hostetler LLP

(57) ABSTRACT

The invention consists of a system for converting wind energy (SCEE) into mechanical and then electrical energy. This system (SCEE) is not subject to the theoretical Betz limit (59%). The system (SCEE) has a wheel (F) provided with a series of blades arranged all around it. The wheel (F) rotates in a pivot connection about a fixed axle (L). Set on the axle (L), a support (E) ensures the fastening of the end-plates of a series of double-acting actuating cylinders (D). The rods of the latter are in a ball-jointed connection with the body (A) in order to offer the latter a maximum degree of freedom in space. A rigid arm (C) is set on one side of the wheel (F) and held on the other side, in a pivot connection, on a U-shaped section piece (B). Having a circular satellite motion, the latter rotates with the wheel (F) while sliding over a peripheral region of the body (A). When the wind acts on the body (A), the latter pivots with the section piece (B) and pushes the rods of the actuating cylinders (D). Having a circular satellite motion, the section piece (B) rotates while sliding over a peripheral region of the body (A), thus changing the fulcrum of the moment of the resultant force of the wind (the pivot connection of the section piece (B)) which is applied to the body (A). The rods of the actuating cylinders (D) will consequently be pulled and pushed, while having a cyclical translational motion. Set on the axle (L), a nacelle (J) primarily contains a hydraulic motor (H) and an electric generator (G), which can be coupled via a speed-increasing gear. During the reciprocal motions of the pistons of the actuating cylinders (D), a set of valves ensures a one-way flow of hydraulic fluid in the "go and return" hydraulic circuits, whether by pulling or by pushing. The "go and return" hydraulic circuits are, moreover, linked to the hydraulic motor (H). In order to allow the system (SCEE) to be held facing the wind and to pivot on the mast (1), its orientation can be ensured by a tail vane (K) fastened, via a support, to the nacelle (J).

10 Claims, 7 Drawing Sheets

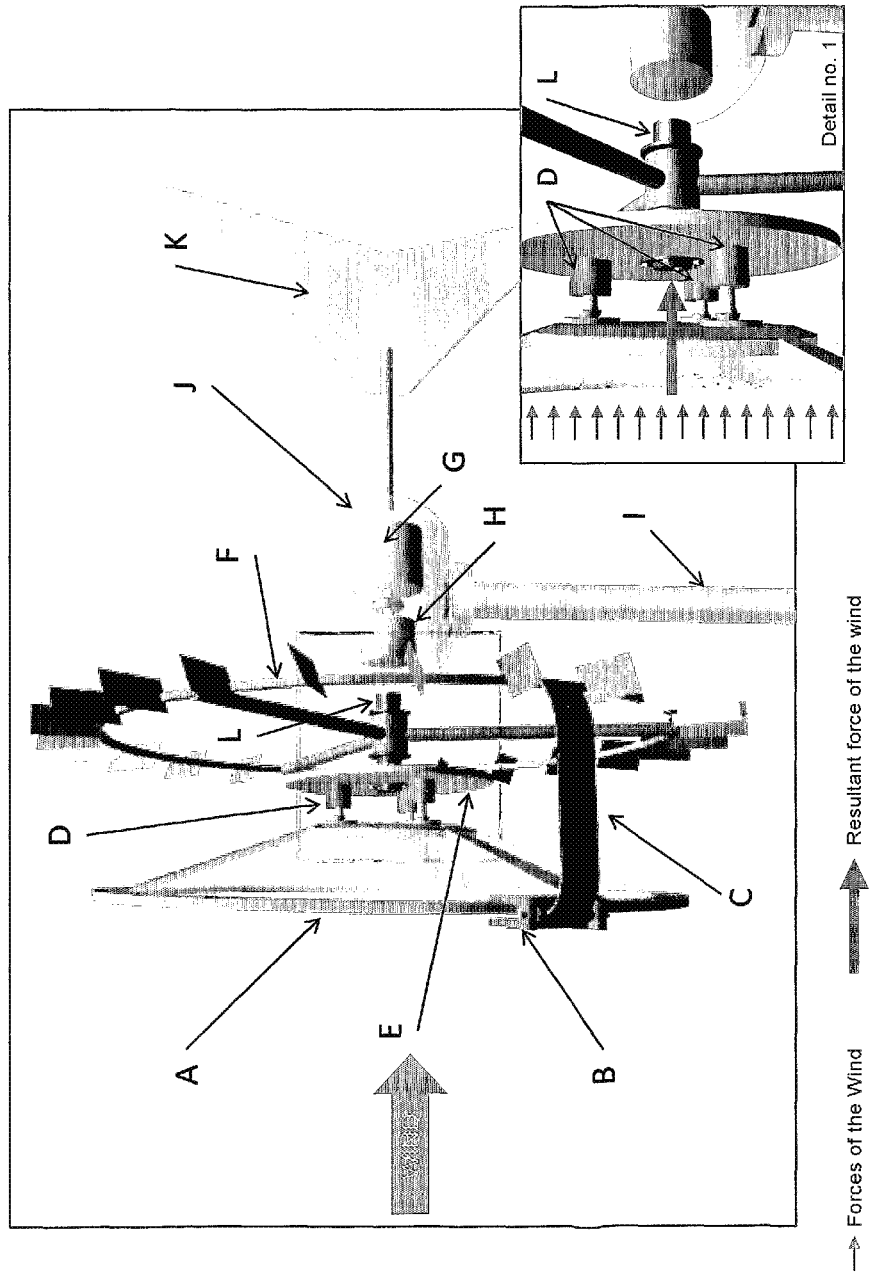
FIG. 1: THE WIND ENERGY CONVERSION UNIT

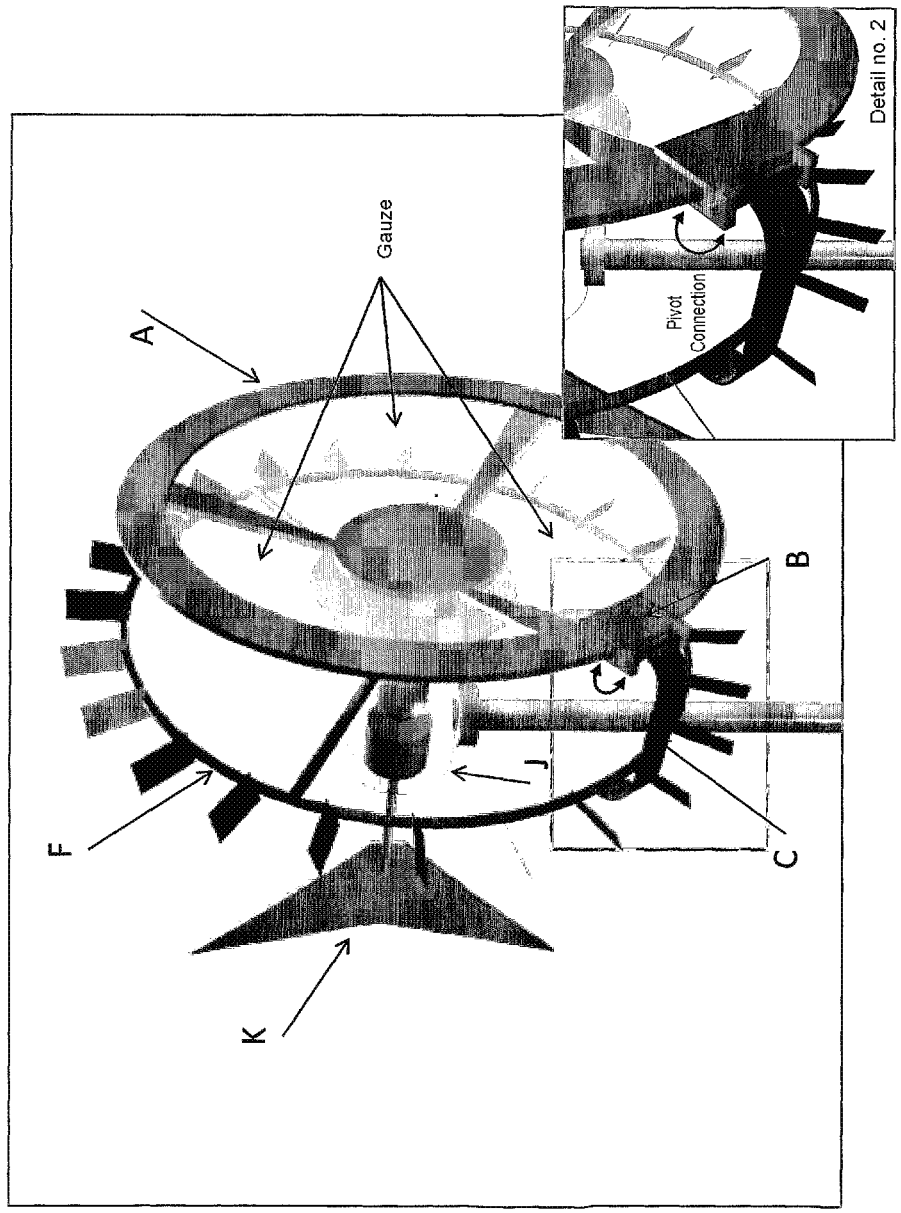

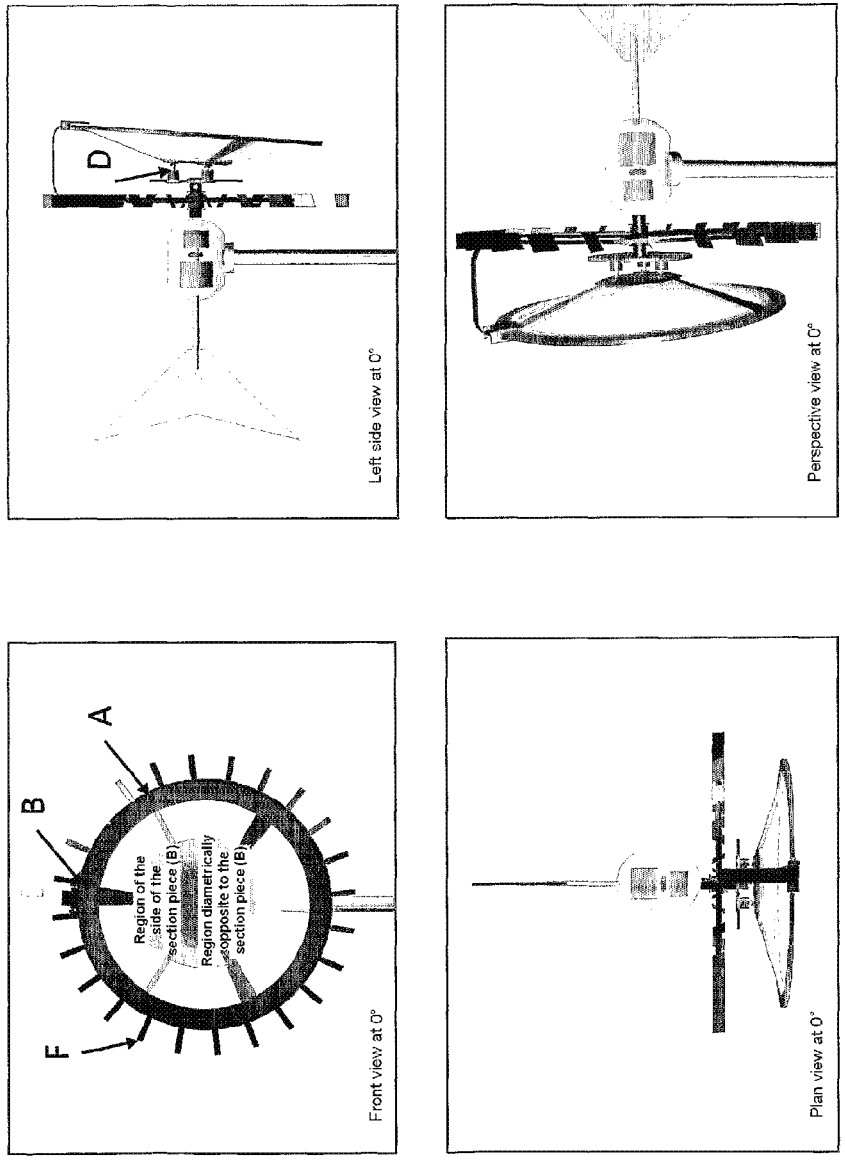
FIG. 3: MOTION OF THE WIND ENERGY CONVERSION UNIT AT 0°

FIG. 4: MOTION OF THE WIND ENERGY CONVERSION UNIT AT 90°
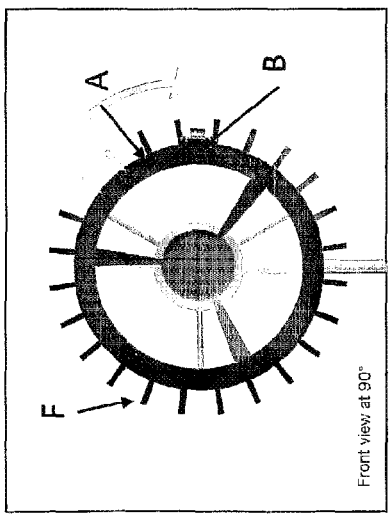
Front view at 90°
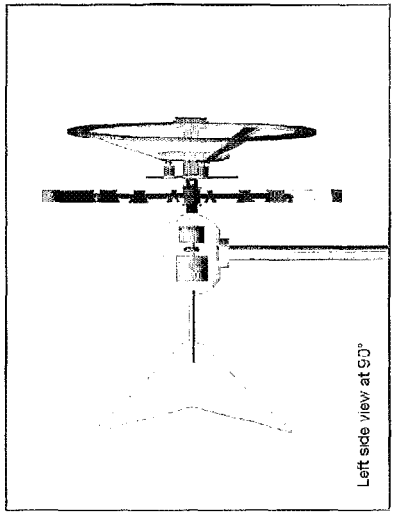
Left side view at 90°
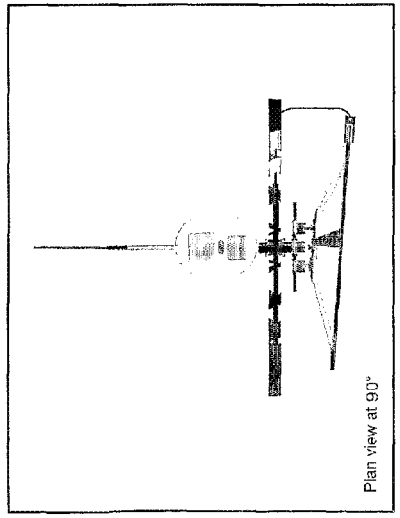
Plan view at 90°
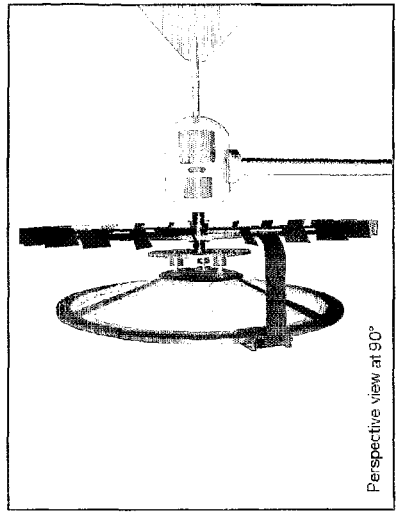
Perspective view at 90°

FIG. 5: MOTION OF THE WIND ENERGY CONVERSION UNIT AT 180°
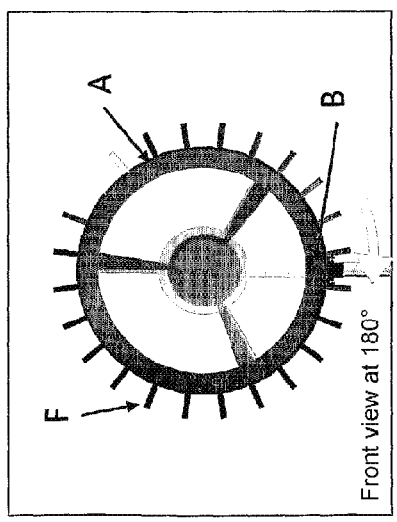
Front view at 180°
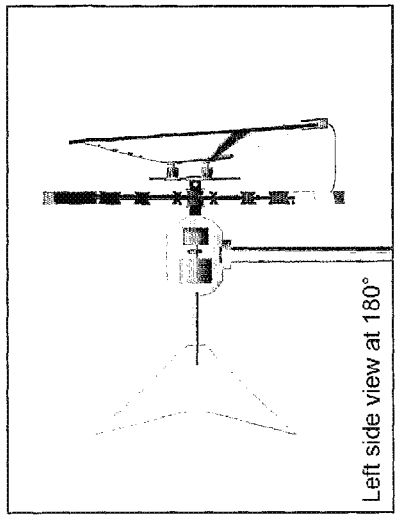
Left side view at 180°
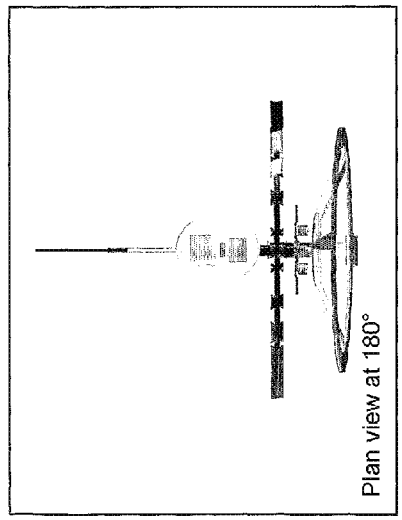
Plan view at 180°
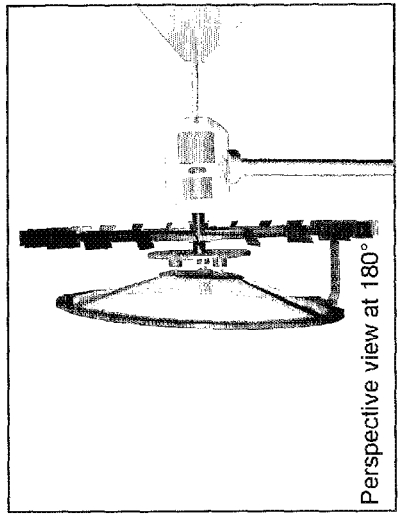
Perspective view at 180°

FIG. 6: MOTION OF THE WIND ENERGY CONVERSION UNIT AT 270°
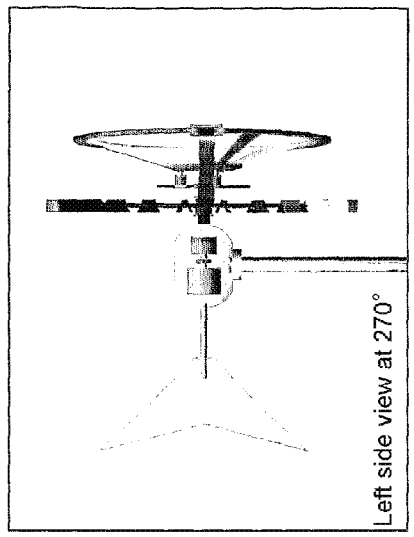
Left side view at 270°
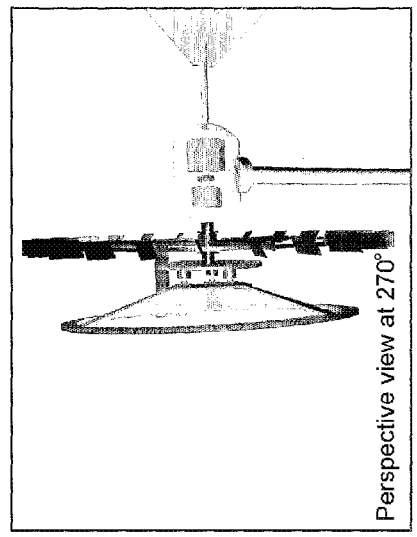
Perspective view at 270°
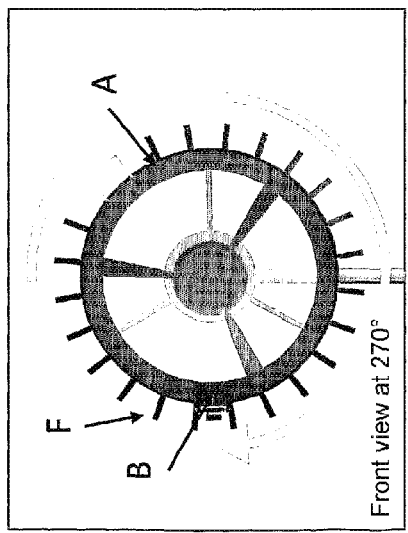
Front view at 270°
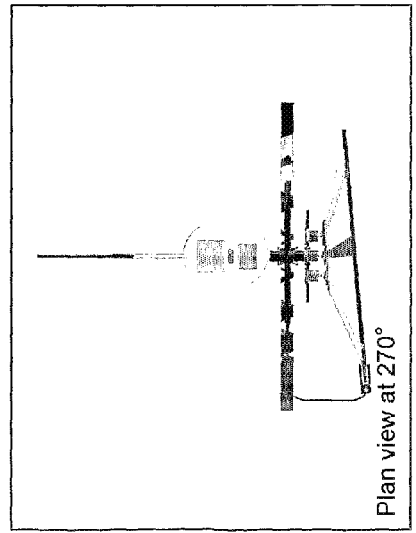
Plan view at 270°

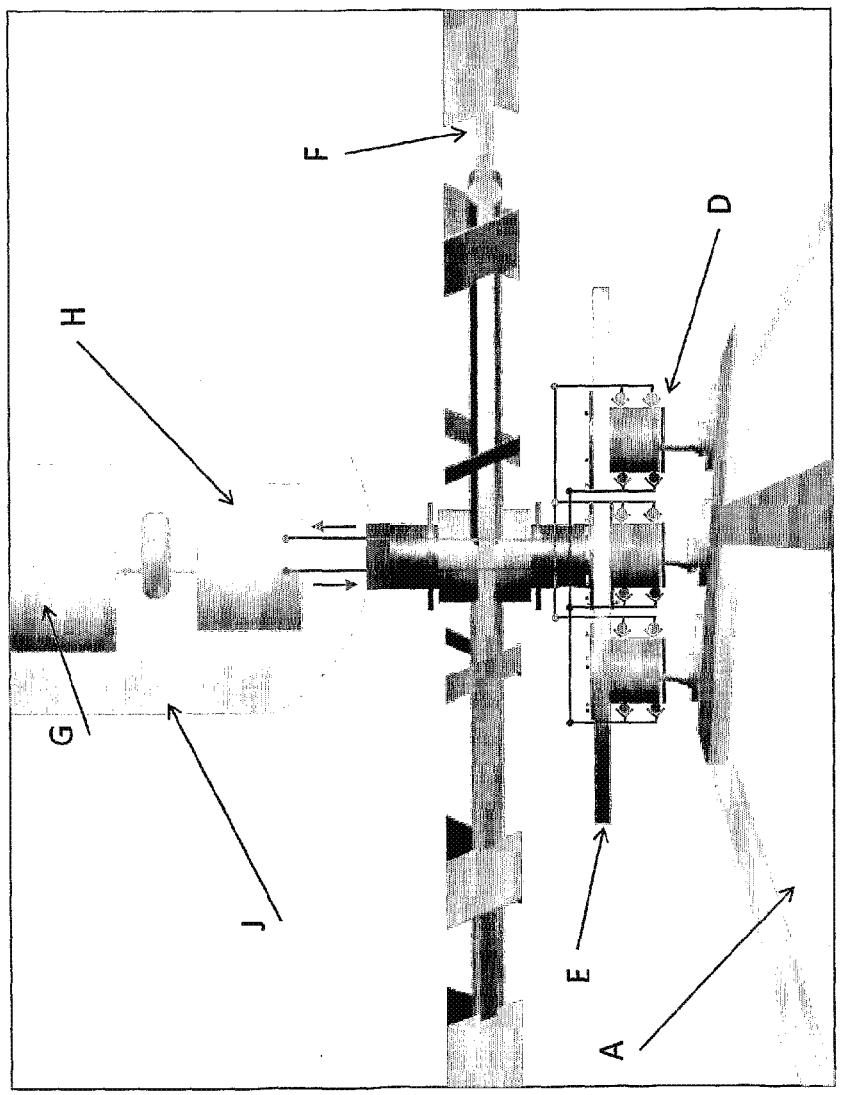
FIG. 7: ACTUATING CYLINDER (D) HYDRAULIC CIRCUIT HYDRAULIC MOTOR (H)

SYSTEM FOR CONVERTING WIND ENERGY

CROSS-REFERENCE TO RELATED APPLICATIONS

This application is a National Stage of International patent application PCT/TN2010/000005, filed on Oct. 6, 2010, which claims priority to foreign Tunisian patent application No. TN2010/0433, filed on Sep. 22, 2010, the disclosures of which are incorporated by reference in their entirety.

FIELD OF THE INVENTION

The invention that is the subject of this technical description consists of a system for converting wind energy (SCEE) into mechanical then hydraulic and electrical energy.

BACKGROUND OF THE INVENTION

This system for converting wind energy (SCEE), described hereinbelow, is not subject to the theoretical Betz limit (59%). Consequently, this invention offers an efficiency far superior to that of the wind turbines currently used.

DETAILED DESCRIPTION

The system (SCEE) has a wheel (F) provided with a series of blades arranged all around it (see FIG. 1). The wheel (F) rotates in a pivot connection about a fixed axle (L), by virtue of the kinetic energy of the wind which passes through the blades, thus offering the wheel (F) a rotational mechanical energy.

Set on the axle (L), a support (E), which is fairly rigid, ensures the fastening of the end-plates (or of the rear end) of a series of double-acting actuating cylinders (D). The latter can consist of one or more double-acting actuating cylinders (see FIG. 1). In order to simplify this description, this system (SCEE) has a series of three double-acting actuating cylinders. The series of double-acting actuating cylinders (D) on the support (E) have to be distributed and positioned in a well-defined manner in order to guarantee better operation (see detail no. 1 of FIG. 1).

The rods of the pistons of the series of double-acting actuating cylinders (D) are in a ball-jointed connection with the body (A) in order to offer the latter a maximum degree of freedom in space, apart from the rotational motion relative to the axle (L) that the kinetic chain of the system as a whole does not allow it to perform. The degrees of freedom thus offered to the body (A) allow it to benefit from a movement and a behavior that are more fluid facing the wind (see detail no. 1 of FIG. 1) and (FIG. 7). This body (A) has a concave form, aiming obtain a higher aerodynamic resistance factor (drag factor, Cx) and therefore a maximum of resultant force of the wind picked up. Moreover, the body (A) should be as light as possible. For this, and in a nonlimiting manner, a part of its surface can be, for example, covered with gauze (see FIG. 2).

Thus, to allow the wheel (F) to rotate freely and independently of the body (A) which is freed of rotation relative to the axle (L), its active surface (the surface facing the wind) is permanently held exposed to the wind (see the front views of FIGS. 3-6).

The fastenings of the rods of the pistons of the double-acting actuating cylinders (D) on the body (A) have to be away from the axis which coincides with the direction of the vector of the resultant force of the wind which drives the body (A) (see detail no. 1 of FIG. 1).

A rigid arm (C) is set on one side on the wheel (F) and held on the other side, in a pivot connection, on a U-shaped section piece (B). Having a circular satellite motion, the latter rotates, consequently, with the wheel (F) while sliding over a peripheral region of the body (A) (see FIG. 2). In order to minimize the sliding friction of the section piece (B), the latter can be in contact with the faces of the peripheral region of the body (A) via rollers or similar. Moreover, the peripheral region of the body (A) should be fairly smooth and fairly rigid.

When the wind acts on the body (A), the latter pivots without performing any rotation, under the effect of the moment of the resultant force of the wind, having as fulcrum that of the section piece (B); thus, the body (A) pushes, without jamming, by virtue of the ball-jointed connections, the rods of the double-acting actuating cylinders (D) which are present in the region diametrically opposite to the section piece (B). The rods of the double-acting actuating cylinders (D) present in the inverse region (region on the side of the section piece (B)) have a tendency to be pulled (see FIG. 3).

Having a circular satellite motion, the section piece (B) rotates while sliding over a peripheral region of the body (A), thus changing the fulcrum of the moment of the resultant force of the wind (the pivot connection of the section piece (B)) which is applied to the body (A). The rods of the double-acting actuating cylinders (D) will consequently be pulled and pushed, while having a cyclical translational motion (see FIGS. 3-6). Thus, the wind energy picked up by the body (A) is converted into translational mechanical energy on the pistons of the double-acting actuating cylinders (D), thus hydraulic pressure on the latter. It is obvious to the person skilled in the art that this mechanism can be replaced by any other device making it possible to convert translational mechanical energy into hydraulic energy, such as single-acting actuating cylinders, axial pistons.

The front, left side, plan and perspective views of FIGS. no. 3, no. 4, no. 5 and no. 6 show the action of the body (A) on the rods of the double-acting actuating cylinders (D) as well as the behavior of the system (SCEE) facing the wind, for different positions (0°, 90°, 180° and 270°) of the section piece (B) on the peripheral region 1 of the body (A).

A nacelle (J) is set on the axle (L). This nacelle (J) primarily contains a hydraulic motor (H) and an electric generator (G), which can be coupled via a speed-increasing gear (see FIG. 1).

During the reciprocal motions of the pistons of the series of double-acting actuating cylinders (D), the latter push a hydraulic fluid toward the go hydraulic circuit (in red) in one direction, whether by pulling or by pushing and do so by virtue of a set of valves (see FIG. 7). The latter also makes it possible to suck the hydraulic fluid into the double-acting actuating cylinders (D) through the return hydraulic circuit (in blue) and do so in one direction, "regardless of the pulling or pushing motion".

The go hydraulic circuit (in red) is connected to the input of a hydraulic motor (H). The return hydraulic circuit (in blue), is elsewhere connected to the output of the hydraulic motor (H) (see FIG. 7). Thus, the pressurized flow of the hydraulic fluid is converted into a rotational motion of the axle of the motor (H), which is connected to the axle of the electric current generator (G), via a speed-increasing gear, thus generating the actual electric energy (see FIG. 7). Moreover, it is obvious to the person skilled in the art that by using the hydraulic transmission vector between the mechanical and electrical energy it becomes possible to immediately convert the pressurized flow thus obtained via the hydraulic motor (H) or to store it in its original hydraulic form, for a subsequent use.

In order to allow a constant orientation facing the wind, the system (SCEE), can be equipped with an automatic orientation system enabling it to pivot on the mast (I) and to keep the body (A) and the wheel (F) permanently facing the wind, and do so in downstream or upstream mode. Moreover, the orientation can be ensured using a tail vane (K), of well determined dimensions, fastened, through a support, to the nacelle (J) (see FIG. 1). In order to simplify the operation of the orientation of the system (SCEE), and in a nonlimiting manner, the tail vane (K) solution is, in this case, retained as an explanatory example.

Thus, the wind energy picked up by the body (A) is converted into a translational, then rotational, mechanical energy respectively via the rods of the series of actuating cylinders (D) and the hydraulic motor (H). This mechanical energy is subsequently converted into electrical energy using the electric generator (G). The link of this energy conversion chain, in relation to the conversion of the translational mechanical energy into rotational mechanical energy, can be handled, and in a nonlimiting manner, via a number of other mechanisms such as connecting rod-crank or similar.

As stated at the start of the technical description, this system (SCEE) is not subject to the theoretical Betz limit (16/27) and offers a better wind energy conversion efficiency. The only component subject to the Betz limit is only the wheel (F) which presents only a minimal active surface relative to the overall active surface of the system (SCEE). Furthermore, this wheel (F) is used only to change the position of the section piece (B) by a circular satellite motion and the energy that it picks up is not taken into account in the energy conversion chain, described hereinabove, or in the final energy recovered. Thus, the rotation of the section piece (B) via the wheel (F), which is its sole function, is ensured by a mechanism using the quantity of wind energy driving the blades thereof; consequently, this device can be replaced by other mechanisms capable of ensuring the same function of rotating the section piece (B).

The invention claimed is:

1. A system for converting wind energy transforming the kinetic energy of the wind into mechanical then hydraulic and/or electrical energy, comprising: a support, set on the axle, which ensures the fastening of the end-plates of a series of double-acting actuating cylinders, the rods of which are in a ball-jointed connection with the body offering the latter a maximum degree of freedom in space; a rigid arm set on one side on the wheel rotating about the axle and held on the other side in a pivot connection to a U-shaped section piece, so that when the wind acts on the body which is freed from rotation relative to the axle, said body, the main receiving body of the wind energy, pivots with the section piece and pushes the rods of the actuating cylinders, the section piece rotates while sliding over a peripheral region of the body while having a circular satellite motion, thus changing the fulcrum of the moment of the resultant force of the wind, which is in fact the pivot connection between the section piece and the rigid arm, which is applied to the body, which has the effect of pulling and pushing the rods of the actuating cylinders, while having a reciprocating cyclical translational motion, thus transforming the mechanical energy transmitted into hydraulic energy set on the axle; a nacelle which primarily contains a hydraulic motor and an electric generator which can be coupled via a speed-increasing gear; a set of valves ensuring a one-way flow of hydraulic fluid in go and return hydraulic circuits, whether by pulling or by pushing the pistons of the actuating cylinders which are, moreover, linked to the hydraulic motor in order to allow the system to be held facing the wind and to pivot on the mast fastened, via a support, to the nacelle.

2. The system for converting wind energy as claimed in claim 1, wherein the body is freed of rotation relative to the axle and has a concave form having an aerodynamic drag factor Cx that is as high as possible in order to maximize the resultant force of the wind which is applied to the body.

3. The system for converting wind energy as claimed in claim 1 wherein the support, which ensures the fastening of the end-plates of a series of double-acting actuating cylinders, the number of which can vary, can be distributed symmetrically, dissymmetrically or asymmetrically relative to the axis of the resultant force of the wind which is applied to the body and be placed at different distances relative to the axis of the resultant force of the wind which is applied to the body.

4. The system for converting wind energy as claimed in claim 1, wherein the double-acting actuating cylinders pick up the kinetic energy of the wind transmitted by the body via the reciprocal translation of their rods; said double-acting actuating cylinders can be replaced by single-acting actuating cylinders, axial pistons or any other mechanism for converting translational mechanical energy into hydraulic energy.

5. The system for converting wind energy as claimed in claim 1 wherein the U-shaped section piece (B) rotates about the axle (L) in a circular satellite motion, while sliding over a peripheral region of the body (A), a region which can, in a nonlimiting manner, be located at different distances from the axle.

6. The system for converting wind energy as claimed in claim 1 wherein the wind energy picked up by the body which is converted into translational then rotational mechanical energy via the actuating cylinders, transforms the duly obtained energy into hydraulic energy under pressure toward a hydraulic circuit, which, by its nature, offers the possibility of being stored in its original hydraulic form for subsequent use or of immediately actuating the hydraulic motor.

7. The system for converting wind energy as claimed in claim 1 wherein during its operation, the body, freed of rotation relative to the axle, can have a clad surface, advertising poster or similar, the content of which remains legible during operation, thus facilitating its integration into the landscape and ensuring a better continuity and uniformity with the natural, rural and/or urban environment.

8. The system for converting wind energy as claimed in claim 1 wherein the rotation of the wheel and therefore of the section piece (B) which is set thereon, is ensured by virtue of the quantity of wind energy picked up by said wheel, this quantity of energy is not taken into account in the final energy recovered and can consequently be replaced by any mechanism capable of ensuring the same rotation function.

9. The system for converting wind energy as claimed in claim 1 wherein the hydraulic energy supplied by the actuating cylinders and transmitted via the go and return hydraulic circuits to the hydraulic motor, offers the possibility to the latter, and to other elements, such as electric generator, hydraulic circuit, electrical wiring, etc. of being placed outside the nacelle and, in a nonlimiting manner, on the ground or similar, while retaining the inter-connectivity between the actuating cylinders and the motor, wherein this advantage minimizes the overall weight of the nacelle, the installation and maintenance costs and offers better control and better supervision.

10. The system for converting wind energy as claimed in claim 1 wherein the transmission and the transformation of the translational mechanical energy, of the rods of the pistons of the actuating cylinders (D), into rotational mechanical energy of the shaft of the hydraulic motor (H), is done via a hydraulic energy vector, via the go and return hydraulic circuit, this transmission and this transformation can be done by other mechanisms such as connecting rod-crank or similar.

* * * * *